United States Patent
Simon et al.

(10) Patent No.: US 8,499,244 B2
(45) Date of Patent: Jul. 30, 2013

(54) AUTOMATION-RESISTANT, ADVERTISING-MERGED INTERACTIVE SERVICES

(75) Inventors: Daniel R. Simon, Kirkland, WA (US); Xiaofeng Fan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 12/183,089

(22) Filed: Jul. 31, 2008

(65) Prior Publication Data

US 2010/0031287 A1 Feb. 4, 2010

(51) Int. Cl.
*G06F 3/00* (2006.01)

(52) U.S. Cl.
USPC ........... 715/741; 715/764; 715/863; 715/742; 726/2; 726/27

(58) Field of Classification Search
USPC ................. 715/716, 745, 764, 833, 863, 741, 715/742; 726/2, 27
See application file for complete search history.

(56) References Cited

U.S. PATENT DOCUMENTS

| | | | |
|---|---|---|---|
| 6,460,084 B1 | 10/2002 | Van Horne et al. | |
| 7,231,651 B2 | 6/2007 | Pong | |
| 7,479,949 B2* | 1/2009 | Jobs et al. | 345/173 |
| 7,929,805 B2* | 4/2011 | Wang et al. | 382/298 |
| 8,019,127 B2* | 9/2011 | Misra | 382/115 |
| 8,060,916 B2* | 11/2011 | Bajaj et al. | 726/3 |
| 8,209,741 B2* | 6/2012 | Elson et al. | 726/2 |
| 2001/0047294 A1* | 11/2001 | Rothschild | 705/14 |
| 2001/0054181 A1 | 12/2001 | Corvin | |
| 2002/0143628 A1* | 10/2002 | Park | 705/14 |
| 2004/0237102 A1 | 11/2004 | Konig et al. | |
| 2006/0070095 A1 | 3/2006 | Newton et al. | |
| 2006/0235756 A1 | 10/2006 | Pellegrino | |
| 2007/0124157 A1 | 5/2007 | Laumeyer et al. | |
| 2007/0156838 A1* | 7/2007 | Kocho et al. | 709/217 |
| 2007/0294772 A1 | 12/2007 | Hydrie et al. | |
| 2008/0133321 A1* | 6/2008 | Pennock et al. | 705/10 |
| 2008/0189768 A1* | 8/2008 | Callahan et al. | 726/4 |
| 2009/0030787 A1* | 1/2009 | Pon et al. | 705/14 |
| 2009/0171780 A1* | 7/2009 | Aldrey et al. | 705/14 |
| 2010/0005420 A1* | 1/2010 | Schneider | 715/833 |

OTHER PUBLICATIONS

Ads in Captchas, Jan. 17, 2007 http://www.jochemprins.com/2007/01/17/ads-in-captchas/. Last accessed May 6, 2008, 3 pages.

(Continued)

*Primary Examiner* — Omar Abdul-Ali
*Assistant Examiner* — Sherrod Keaton
(74) *Attorney, Agent, or Firm* — Westman, Champlin & Kelly, P.A.

(57) ABSTRACT

Systems and methodologies for implementing automation-resistant interactive computing services are provided herein. Function invocation mechanisms can be utilized as described herein to facilitate invocation and/or activation of one or more functions of an interactive service upon performance of an interaction falling within a predefined class of interaction with selected multimedia content. The described functionality invocation mechanisms can operate similarly to a traditional captcha image by requiring interaction that is easily understandable and performable by a human user but is prohibitively difficult for an automated program to carry out. Techniques such as masking relationships between user interaction and function invocation and varying elements of the selected multimedia content for respective accesses can be utilized to provide additional resistance to automation. Described invocation mechanisms can additionally be merged with advertising, which can optionally be targeted to a particular user(s).

16 Claims, 13 Drawing Sheets

OTHER PUBLICATIONS

Captcha Advertising, Oct. 27, 2005. http://adverlab.blogspot.com/2005/10/captcha-advertising.html. Last accessed May 6, 2008, 4 pages.

Cho, et al. Different Forced-Exposure Levels to Banner Advertisements, in Journal of Advertising Research, published Jul. 1, 2001.

http://www.accessmylibrary.com/coms2/summary_0286-2027890_ITM. Last accessed May 6, 2008, 3 pages.

Fox. The Advert Enforcer, Apr. 18, 2006. In NewScientistTech http://technology.newscientist.com/article/dn9011-invention-the-tvadvert-enforcer.html. Last accessed May 6, 2008, 3 pages.

* cited by examiner

900

Play Audio

*With your mouse, circle the type of product described in the audio clip to continue.*

Clothing

Automobile

Food

Movie

AUTOMATION-RESISTANT, ADVERTISING-MERGED INTERACTIVE SERVICES

BACKGROUND

As interactive computing services, such as Web-based consumer services, have become cheaper to implement, the added cost imposed by various forms of direct payment has become prohibitive. As a result, many current interactive computing services utilize an advertising-based revenue model. However, advertising as a revenue source suffers from a fundamental vulnerability, in that advertisements can often be distinguished from the content or service that accompanies them and then removed. Indeed, it has been observed that users of interactive services often prefer to avoid advertisements altogether and will enthusiastically adopt technological measures that filter them out.

As an example in the field of television content distribution, various remote control-equipped video recording devices have been developed that enable viewers to skip advertisements in recorded content, to the point where advertisers and content providers have been motivated to seek alternative ways to ensure that advertisements reach viewers. One such solution that has seen a recent dramatic increase in use is "product placement," in which flattering displays or mentions of products, which are effectively advertisements, are integrated into content in a way that makes them impossible to skip without substantially degrading the viewing experience.

However, in the case of Web-based services and other interactive computing services, the above problems are further complicated by significant flexibility provided by customer client platforms. For example, Web-based services can often be utilized with upgradeable applications that are capable of identifying a specific service, simulating a user's permissible requests to it, and then removing advertisements from the resulting responses using sophisticated custom-tailored filtering techniques. Accordingly, it is possible to create "shell services" that exploit Web-based services, such as e-mail or data storage, on a wholesale basis, thereby providing the underlying service, possibly in repurposed form, to customers at a fraction of the cost that the original services incur. For example, a shell service could be implemented to convert a free e-mail service into an advertisement-free cloud storage or messaging platform.

Such a shell service could earn revenue in a number of ways. For example, it could earn advertising revenue by presenting its own advertisements in lieu of those accompanying the underlying service. Because a shell service is generally less expensive to provide than its underlying service, it can use its increased margins to provide incentives to users to use the shell service, such as by reducing ad volume or providing extra services. Alternatively, a shell service can be designed completely ad-free, thereby giving users an attractive incentive to use it, and instead generate revenue in other ways. For example, such a shell service can utilize an e-mail or other messaging account of a user to send spam or perform other bot-like functionality for the shell service provider. However, in any such case, it can be appreciated that such a shell service utilizes the underlying service without allowing the provider of the underlying service to obtain advertising revenue associated with the service.

The current main line of defense of existing Web-based services against automated repurposing is the captcha, which is a task, such as recognition of an image or distorted characters, which is relatively easily performed by humans but significantly more difficult for computer programs. However, existing shell services can bypass such defenses by recruiting a user to solve any captcha encountered by the shell service. In fact, shell services can utilize such user recruitment as an additional source of revenue due to the economic value of captcha-solving as a means to obtain captcha-gated information. In addition, because standard captchas are often regarded as annoying by users, excessive use of them in order to render shell services unpalatable to users would likely render the underlying service equally unpalatable.

Accordingly, there is a need in the art for techniques for implementing interactive computing services that mitigate at least the above shortcomings.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies are provided herein that facilitate implementation of automation-resistant Web-based services and other interactive computing services. In accordance with one aspect, a function invocation mechanism can be implemented in connection with an interactive service such that one or more functions within the interactive service are invoked by performing an interaction with selected multimedia content from a predefined class of permissible interactions therewith. The multimedia content can include, for example, images, audio, video, and/or any other suitable form of multimedia. Further, the predefined class of interactions can include any suitable movement, engagement, and/or other action with respect to the multimedia content. For example, the interaction can include circling an item in an image, moving an image element, from a first location to a second location, identifying information in a video or audio recording, and the like.

In addition, systems and methods described herein can provide functionality similar to a traditional captcha image by requiring an interaction that is easily understandable and performable by a human user but is prohibitively difficult for a shell service or another unauthorized automated program to carry out. In one example, instructions pertaining to a desired interaction can be given in natural language terms that are substantially simpler for a human to understand than for a machine to understand. In addition, added security against automation can be provided by giving the instructions as part of the multimedia content to which it pertains. As another example, automation of an associated interactive service can be made more difficult by monitoring user movements with respect to multimedia content on a client machine and relaying data relating to the movements to a disparate server machine, at which the movements can be analyzed. By analyzing the movement data at a disparate machine, added protection is provided against reverse-engineering the interactive service to identify the desired interaction with respect to the multimedia content.

In accordance with another aspect, one or more advertising features, such as logos, product images, slogans, audio/video commercials, etc., can be merged into the multimedia content utilized to restrict access to an interactive service. These advertising features can be globally applied, or they can be targeted to one or more users based on user characteristics.

In accordance with a further aspect, multimedia content used as a function invocation mechanism for an interactive service and/or a class of predefined interactions therewith can be varied among users of the interactive service to enhance resistance of the service to automation. For example, the multimedia content and/or desired interaction presented to a particular user can be based on arbitrary and/or non-arbitrary user characteristics, such as the user's current location, weather, IP address, and/or similar characteristics. In addition, multimedia content and/or desired interactions presented to disparate users and/or for disparate accesses of a single user can be randomized to prevent automation of the interaction based on repetition.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
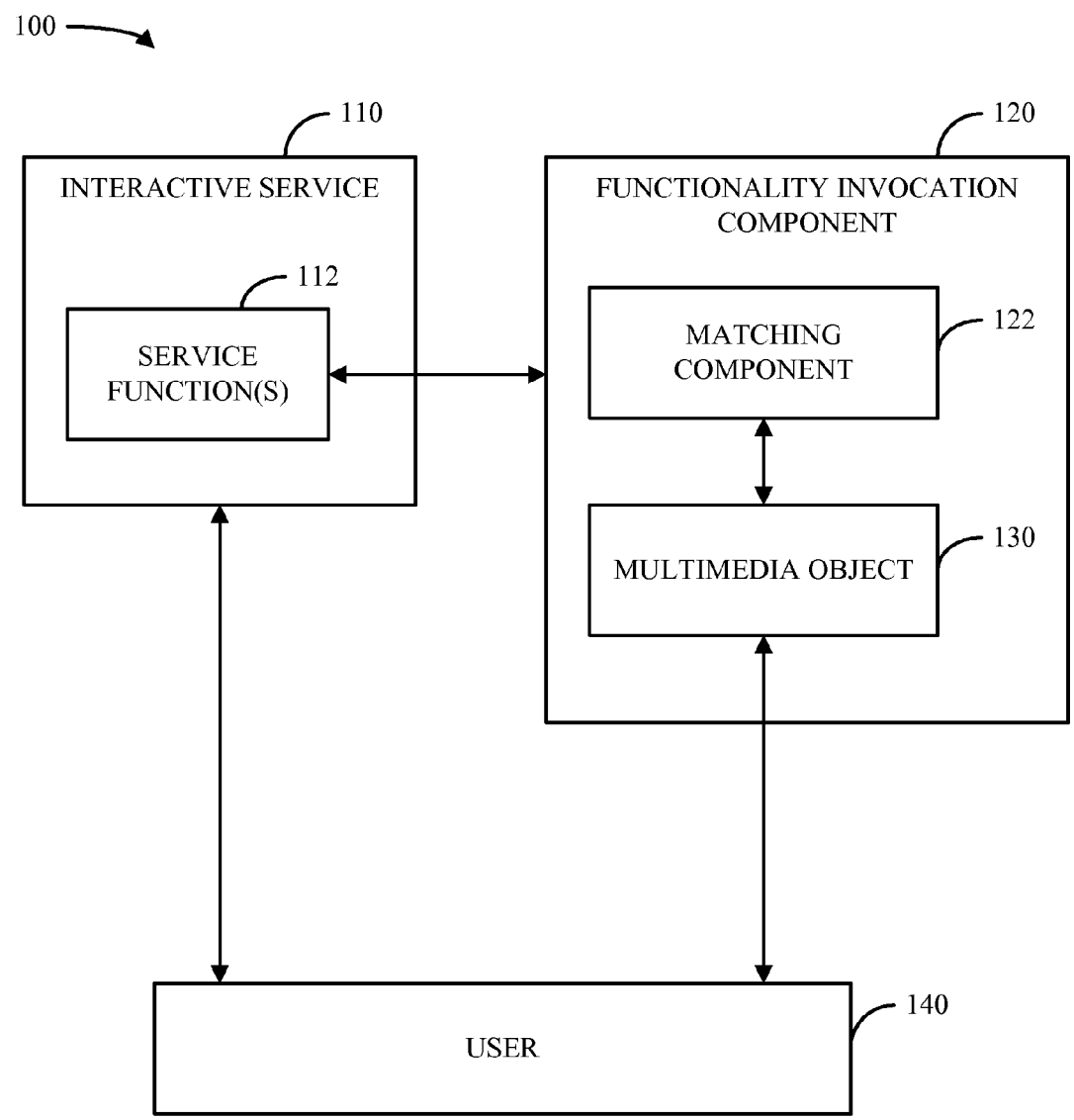
FIG. 1 is a high-level block diagram of a system for providing an interactive computing service in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," "interface," "schema," "algorithm," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawings, FIG. 1 illustrates a block diagram of a system 100 for controlling access to an interactive service 110 in accordance with various aspects described herein. In one example, system 100 can include an interactive computing service 110 with which a user 140 can interact. Interactions between the interactive service 110 and user 140 can include, for example, utilizing one or more functions 112 associated with the interactive service 110.

In accordance with one aspect, system 100 can further include a functionality invocation component 120 that can be utilized to invoke one or more functions 112 associated with the interactive service 110 upon satisfaction of various factors. It should be appreciated that while the functionality invocation component 120 is illustrated as a separate entity within system 100, the functionality invocation component 120 could alternatively be associated with the interactive service 110, a function 112 associated therewith, a machine operated by the user 140, and/or any other appropriate entity in system 100. In one example, the functionality invocation component 120 can prevent automation of the interactive service 110 and/or functions 112 related thereto.

In accordance with one aspect, the functionality invocation component 120 can incorporate one or more multimedia objects 130 into the interactive service 110 and/or functions 112 associated therewith. In one example, the multimedia object(s) 130 can then be delivered to a user 140 within the interactive service 110 as a mechanism to invoke one or more functions 112 within the interactive service 110. In one example, a multimedia object 130 can have a predetermined class of user interactions associated with it, and the functionality invocation component 120 can leverage a matching component 122 and/or other suitable means to monitor user interaction with the multimedia object 130. Upon identifying that an interaction that falls within the predetermined class of user interactions with the multimedia object 130 has been performed, one or more functions 112 of the interactive service 110 can be activated.

By utilizing a functionality invocation component 120 and multimedia objects 130 in the above manner, the threat of shell services can be countered by incorporating a multimedia object 130 into the functionality of an interactive service 110 in such a way that makes the service useless unless a user 140 actually receives and interacts with the multimedia object 130. In one example, multimedia objects 130 can function in a similar manner to product placement in television broadcasting in that the overall user experience with respect to the interactive service 110 is significantly diminished unless a user 140 actually views the multimedia objects 130.

It can be appreciated that system 100 can be utilized in various aspects to require shell services for an interactive service 110 to prove actual user interaction with a multimedia object 120 before one or more functions 112 of the interactive service 112 can be invoked. For example, shell services that provide the advertising of an underlying interactive service 110 can be allowed to function by providing the interactive service 110 to the user in combination with its associated multimedia objects 130.

Figure 2:
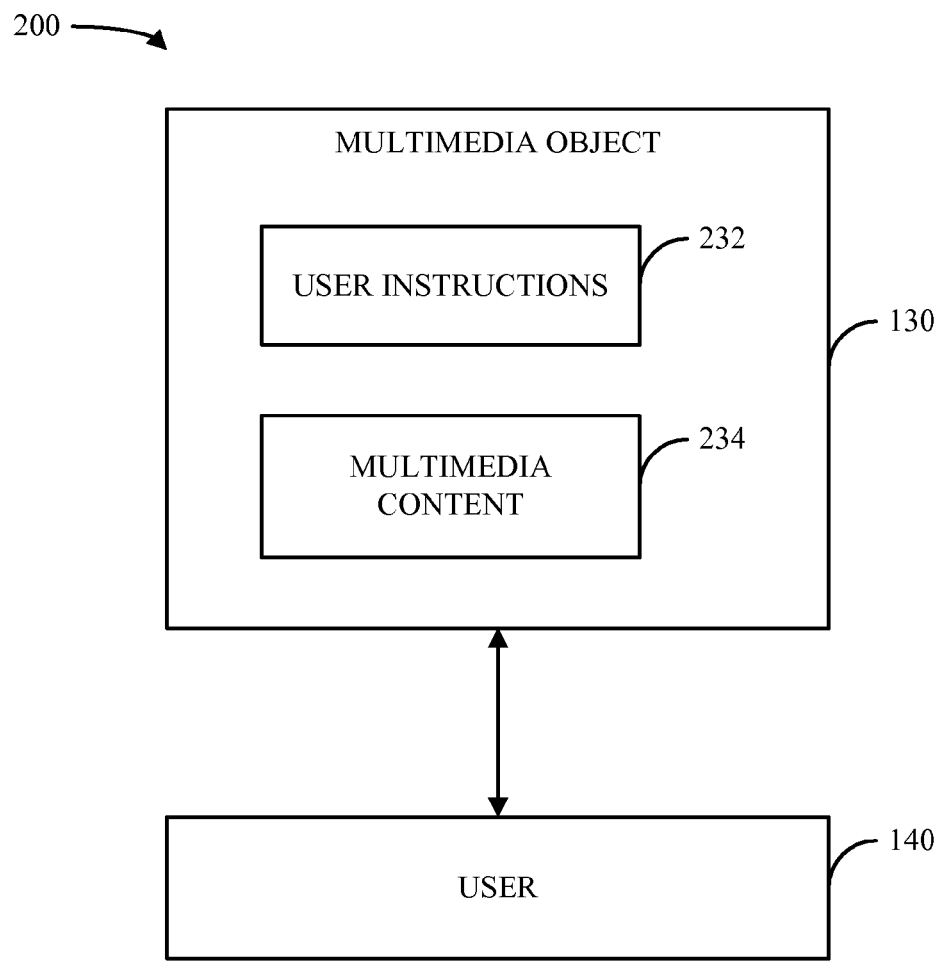
FIGS. 2-3 are block diagrams of respective automation-resistant activation systems for an interactive service in accordance with various aspects.

FIG. 2 is a block diagram of an automation-resistant activation system 200 for an interactive service (e.g., an interactive service 110) in accordance with various aspects. In one example, system 200 can include a multimedia object 130 with which one of a predefined set of interactions must be performed by a user 140 to activate one or more functions of an interactive service. As illustrated in system 200, a multimedia object 130 can include user instructions 232 and multimedia content 234. Multimedia content 234 included in a multimedia object 130 can include any suitable form of multimedia or combination thereof, such as, for example, images, audio, video, and the like. Further, the multimedia content 234 can be provided by an associated memory or disk storage, obtained over a network or internetwork, generated in real time upon generation of a multimedia object 130, and/or obtained in any other appropriate manner. User instructions 232 provided in a multimedia object 130 can provide information to a user 140 relating to the predetermined set of interactions with the multimedia content 234 that must be performed to invoke the one or more functions associated with the multimedia object 130.

In accordance with one aspect, a multimedia object 130 can be designed to prevent a shell service from automatically analyzing an underlying service as it is provided to a user 140 to determine the mapping from user actions to service functionality. It can be appreciated that in conventional services, this mapping is implicitly revealed in two ways: through the instructions that the service gives users on how to invoke functionality, and through the mapping from user actions into function invocations that the service gives the client software at the user device. In the specific example of a Web-based service, for example, user instructions are typically presented in the form of labels displayed on hyperlinks and buttons, and the mapping from user actions to function invocations is implicitly encoded in the Uniform Resource Locators (URLs) or scripts associated with said hyperlinks and buttons. Accordingly, as system 200 illustrates, user instructions 232 associated with a multimedia object 130 can be constructed and/or presented to a user 140 in such a way as to disguise the functionality of the associated interactive service. Techniques for preventing a shell service from obtaining information regarding the mapping from user actions to function invocations are described in further detail infra.

In one example, the user instructions 232 associated with a multimedia object 130 can be made difficult for a shell service to decipher using one or more captcha-like techniques. For example, user instructions 232 can be presented as one or more images embedded into the multimedia content 234 associated with the multimedia object 230. Further, the instructions 232 can be written in natural language, utilize arbitrary custom fonts, and/or employ one or more other mechanisms that are relatively easy for a human user 140 to interpret but are more difficult for computer programs to map to actions. In another example, the multimedia content 234 can contain visual elements that represent objects rather than text, and the required actions can be described in the user instructions 232 as manipulations on these visual elements. As a specific, non-limiting example, in the case of a Web-based e-mail service, a multimedia object 130 can be provided in a user Web browser, wherein the multimedia content 234 corresponds to images of salad-related items at various locations within the browser and the user instructions 232 correspond to a natural language command in a page header that states "drag the broccoli floret into the salad bowl to open a new message," or the like. Based on this multimedia object 130, a function associated with opening a new message can be activated when a user 140 drags an image of a broccoli floret provided in the multimedia content 234 such that it at least partially overlaps a similarly-provided image of a salad bowl.

Figure 3:
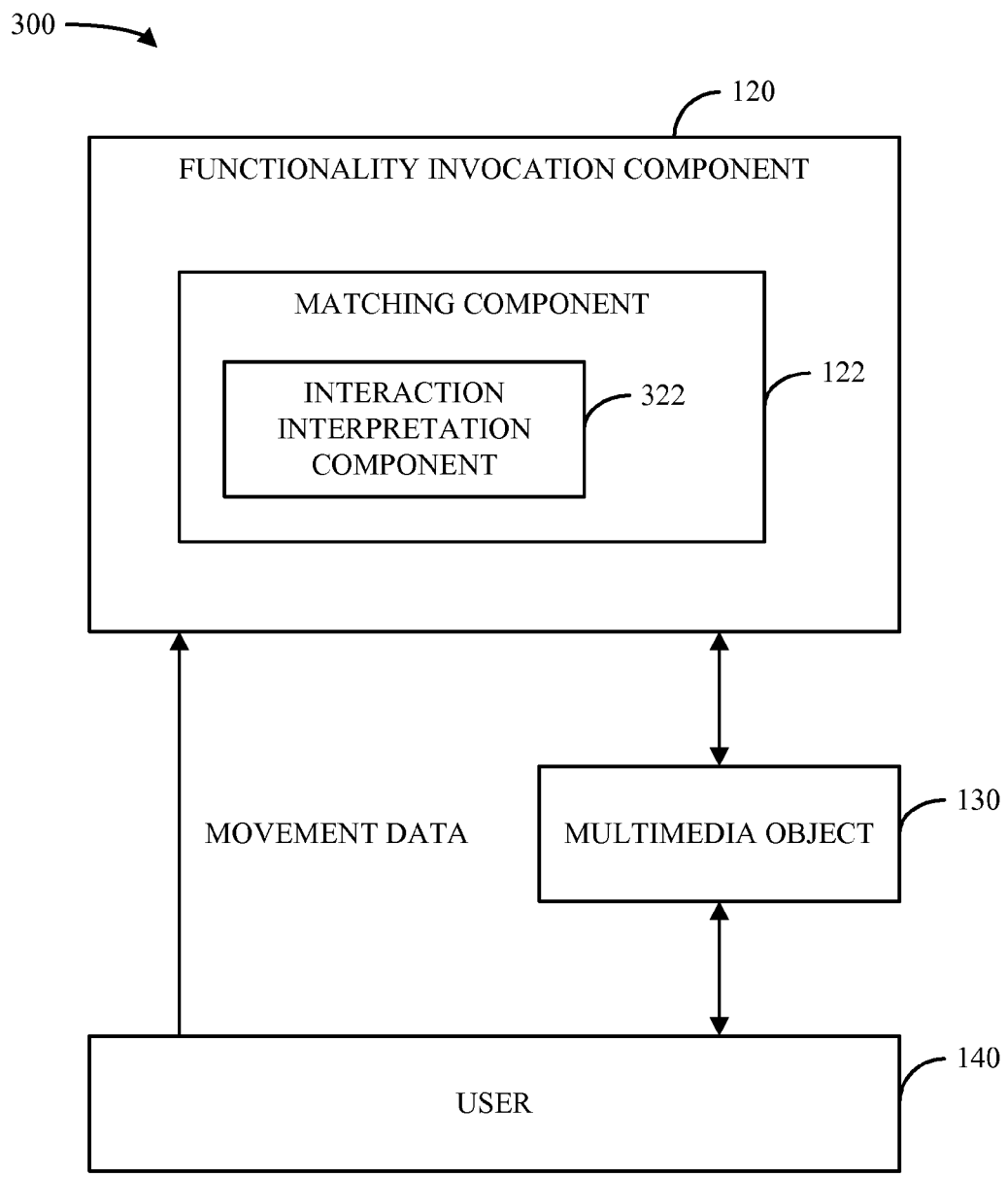

Turning now to FIG. 3, a block diagram of another automation-resistant activation system 300 for an interactive service in accordance with various aspects is illustrated. In one example, system 300 includes a functionality invocation component 120, which can link activation of one or more functions of a Web-based consumer service and/or another suitable interactive service to actual user interaction with a multimedia object 130 as described supra. In one example, as a user 140 interacts with a multimedia object 130, a matching component 122 at the functionality invocation component 120 can compare the user's interaction to a desired class of user interaction. If the user's interaction falls within the desired class of interactions, the protection function(s) can be invoked.

As noted above with respect to system 200, a shell service can facilitate automated use of an interactive computing service by obtaining information relating to a mapping between user interaction to function invocation at the interactive service. Thus, to prevent a shell service from analyzing such a mapping, the functionality invocation component 120 can collect only data relating to actions taken by the user 140 with respect to the multimedia object 130. These data can then be relayed back to the functionality invocation component 120, where an interaction interpretation component 322 at the matching component 122 can be utilized to analyze the interaction data from the user 140 and to determine whether the interactions represented in the data fall within the predetermined class of interaction.

In accordance with one aspect, the functionality invocation component 120 can be located at a server machine that is disparate from a machine on which the user 140 interacts with the multimedia object 130 and related interactive service. Thus, a shell service that monitors operation of a user machine can be made incapable of obtaining information relating to the link between interaction with a multimedia object 130 and function invocation aside from the mere interactions of a user 140 with the multimedia object 130, making it significantly more difficult for the shell service to ascertain the relationship between interaction and function invocation.

In one example, the multimedia object 130 or a service in which the multimedia object 130 is delivered can use script to capture and relay mouse actions and clicks back to the functionality invocation component 120 at a server, where the mapping between those movements and clicks and particular requested functions is kept. The space of possible client function requests would thus reveal nothing in itself about what actions are required to invoke a given function, including possibly multiple clicks and drag-drop actions. In one example, the required actions can be fixed and/or standardized to simplify operation for all but a small number of key functions (e.g., creating a new e-mail or instant message). In this manner, the functionality invocation component 120 can enforce a balance between security and simplicity for an interactive service.

In another example, a desired class of user interaction through a multimedia object 130 can be defined by a series of control points through multimedia content provided in the multimedia object 130. For example, control points can be provided within a multimedia object 130 that specify respective locations within the multimedia content and/or actions to be performed in the content. Based on these control points, the matching component 122, with or without the aid of an interaction interpretation component 322, can analyze user interaction with the multimedia object 130 by matching respective actions performed during the user interaction and/or their locations with the actions and/or locations respectively defined for the control points. Techniques for defining and utilizing control points in the context of a multimedia object 130 are provided in further detail infra.

Figure 4:
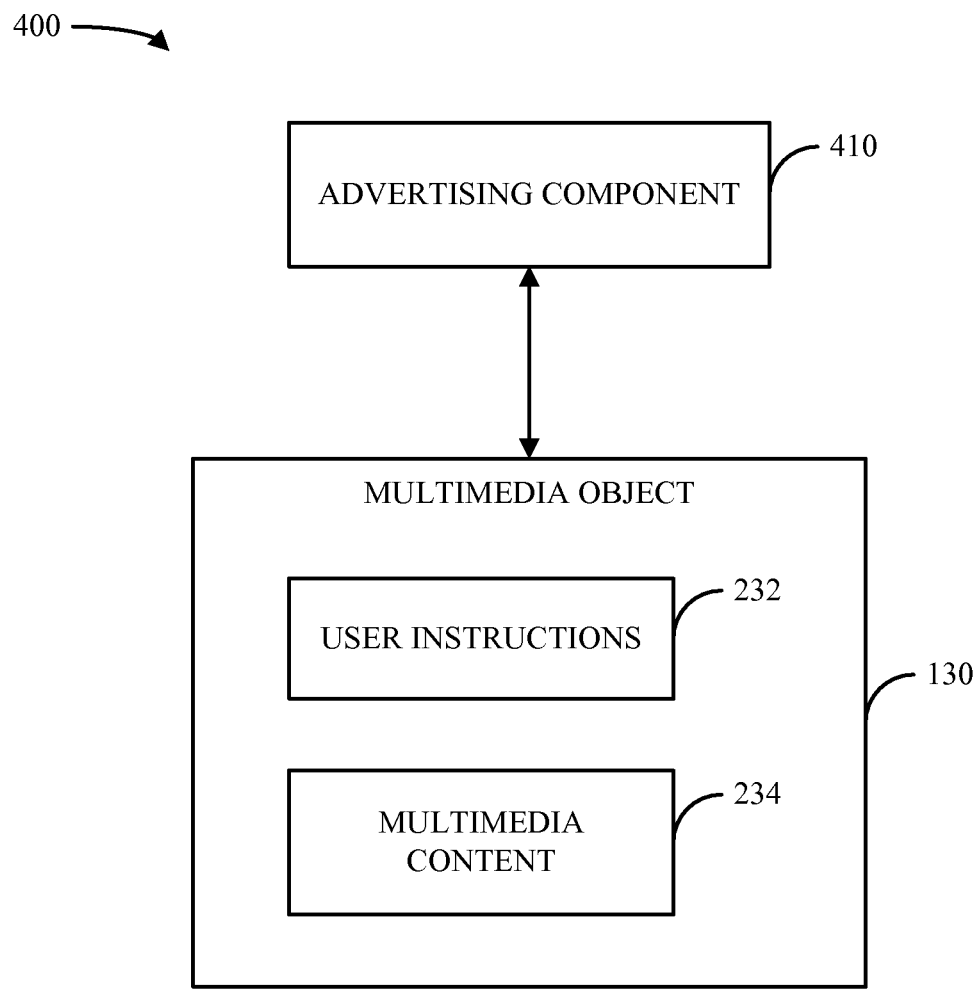
FIGS. 4-5 are block diagrams of respective systems for integrating advertising content into an interactive service in accordance with various aspects.

Referring now to FIG. 4, a block diagram of a system 400 for integrating advertising content into an interactive service in accordance with various aspects is illustrated. In one example, system 400 can include a multimedia object 130. As described above, the multimedia object 130 can facilitate implementation of an automation-resistant interactive computing service. As further described above, multimedia object 130 can include various forms of multimedia content 234 as well as a set of user instructions 232 that relate to an interaction with the multimedia content 232.

In accordance with one aspect, system 400 can further include an advertising component 410, which can provide one or more advertising elements for use in the multimedia object 130. Advertising elements provided by the advertising component 410 can utilize any suitable format, such as text (e.g., product descriptions, slogans, etc.), images (e.g., product images, logos, etc.), audio, video, animated content such as that generated using the Adobe® Flash® platform and/or a similar multimedia authoring platform, or the like. In addition, it can be appreciated that advertising elements can be incorporated into any suitable portion of a multimedia object 130. For example, logos, slogans, and/or other advertising elements can be incorporated into user instructions 232 for a multimedia object 130. Additionally and/or alternatively, one or more advertising elements can be provided as multimedia content 234 in the multimedia object 130.

In accordance with another aspect, multimedia objects 130 and/or the advertising component 410 can enable implementation of an advertising-merged, automation-resistant interactive service. In one example, such a service can be designed to deny access to shell services, which as described above can exploit advertisement-supported interactive services by providing them to customers without the advertising associated with them. Accordingly, by utilizing an advertisement component 410 in association with a multimedia object 130, advertisements can be directly incorporated into the functionality of interactive services in a way that makes them useless unless a user actually views the advertisements. It can be appreciated that this approach functions in a similar manner to product placement for television broadcast by incorporating advertisements into the services such that the functionality of the services is significantly impaired unless and until the user views the advertisements. In the example of Web-based services, advertisements can further be integrated not only with service functionality, so that using the service requires viewing of an ad, but also with captcha-like functionality, so that an actual user, rather than a shell service, must view the ad to obtain access to the service.

In one example, system 400 can be utilized to allow some automated uses of an associated interactive service while disallowing others. For example, some shell services may solicit the help of a user in interacting with multimedia objects 130 and invoking the functionality of an interactive service. If an advertising component 410 is utilized to incorporate advertising into the multimedia objects 130, then the shell service will provide the incorporated advertising to the user with the multimedia objects 130. As a result, the shell service can be regarded as an authorized use of the underlying service as it is providing the advertisements associated with the underlying service to the user via the multimedia objects 130.

With regard to the above, it can be appreciated that a shell service may only represent a threat to a Web-based service if it actually blocks the advertising of the original service. More particularly, if a shell service lets the advertising through, then it does not harm the revenue of the original service and in fact may even increase revenue by drawing a larger audience to the original service's ads. Thus, by employing system 400, such shell services can be viewed as living in symbiosis with an original service, wherein they increase the viewership of the original service while potentially earning revenue for themselves through various means.

In accordance with one aspect, system 400 can additionally enact various measures to ensure the effectiveness of advertisements delivered by the advertising component 410. For example, a shell service might try to reduce the effectiveness of advertisements by disabling click-through functionality, preventing redirects to an advertiser's site. In such an example, the advertising component 410 and/or another entity within system 400 can serve the click-through pages through the site associated with the underlying service in a similar manner to the advertisements. Further, it can be appreciated that once a user has chosen to click through an ad, he or she has demonstrated an interest in viewing the click-through page. Accordingly, a shell service would only be reducing user satisfaction by interfering with the click-through.

In accordance with an additional aspect, the advertising component 410 can integrate with one or more multimedia objects 130 in various manners. For example, a multimedia object 130 can require a user to use the mouse to "operate" an animated version of an advertised product, to select (e.g., by circling) an advertised product from a line of related objects, to identify a product slogan from a list of phrases, and so on. It can be appreciated that if the images and required actions are well-chosen, they can be nearly as easy as conventional button clicks or checkboxes, yet extremely difficult for a shell service to automate. Further, it should be appreciated that if the user is recruited to perform the necessary action, then the ad will in any event have served its purpose. As a result, interactive advertising provided by system 400 can potentially be more effective at capturing user attention and making a strong impression than more standard, non-interactive ads.

Figure 5:
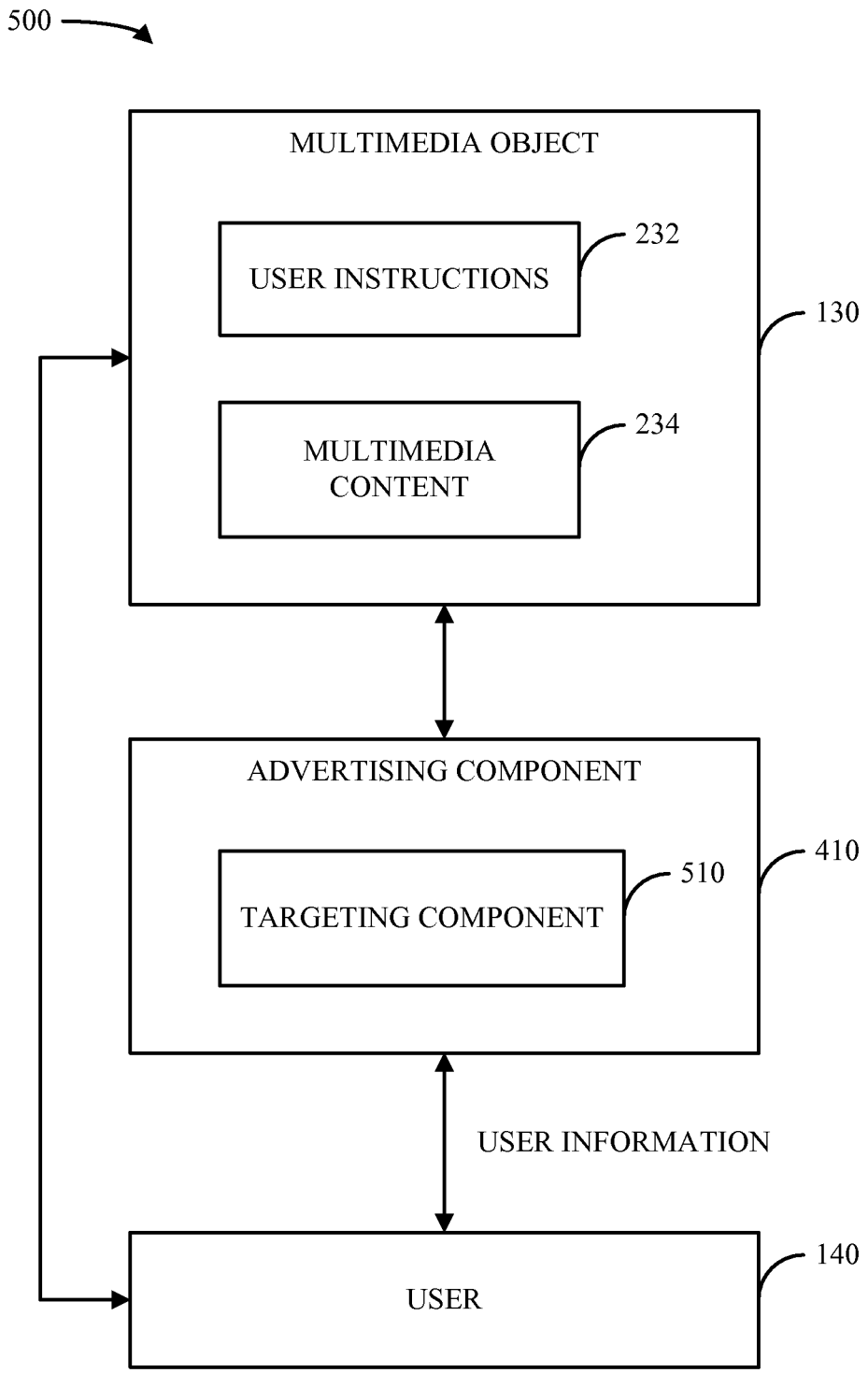

Turning to FIG. 5, a block diagram of another system 500 for integrating advertising content into an interactive service in accordance with various aspects is illustrated. In one example, system 500 can include a multimedia object 130, with which a user 140 can perform one of a predefined set of interactions to access the functionality of an interactive service. As described above, a multimedia object 130 can include user instructions 232 and/or multimedia content 234. In addition, system 500 can include an advertising component 410, which can provide one or more advertising elements for delivery within a multimedia object 130 and/or directly to a user 140 as generally described above with respect to system 400.

In accordance with one aspect, system 500 can further include a targeting component 510 that can analyze one or more characteristics of a user 140 and provide advertising elements and/or other content that is targeted to the user 140. While the targeting component 510 is illustrated in FIG. 5 as associated with the advertising component 410, it should be appreciated that the targeting component 510 can be associated with any other suitable component of system 500 or can be a stand-alone entity within system 500. Further, it should be appreciated that the targeting component 510 can be utilized to provide targeted non-advertisement content in addition to, or in place of, targeted advertisement content.

In accordance with another aspect, the targeting component 510 can collect information relating to a user 140 to facilitate analysis of user characteristics. This information can include, for example, demographic information of the user 140 (e.g., age, occupation, income level, level of education, etc.), user interests, products owned and/or used by the user 140, a current and/or permanent location of the user 140, current weather conditions and/or other characteristics of a location of the user 140, and the like. The targeting component 510 can additionally utilize any suitable mechanism for obtaining information. For example, a user 140 can provide requested information directly, or the targeting component 510 can obtain information independently through cookies and/or other files on a user machine, a network and/or internetwork, and/or any other suitable information source.

Figure 6:
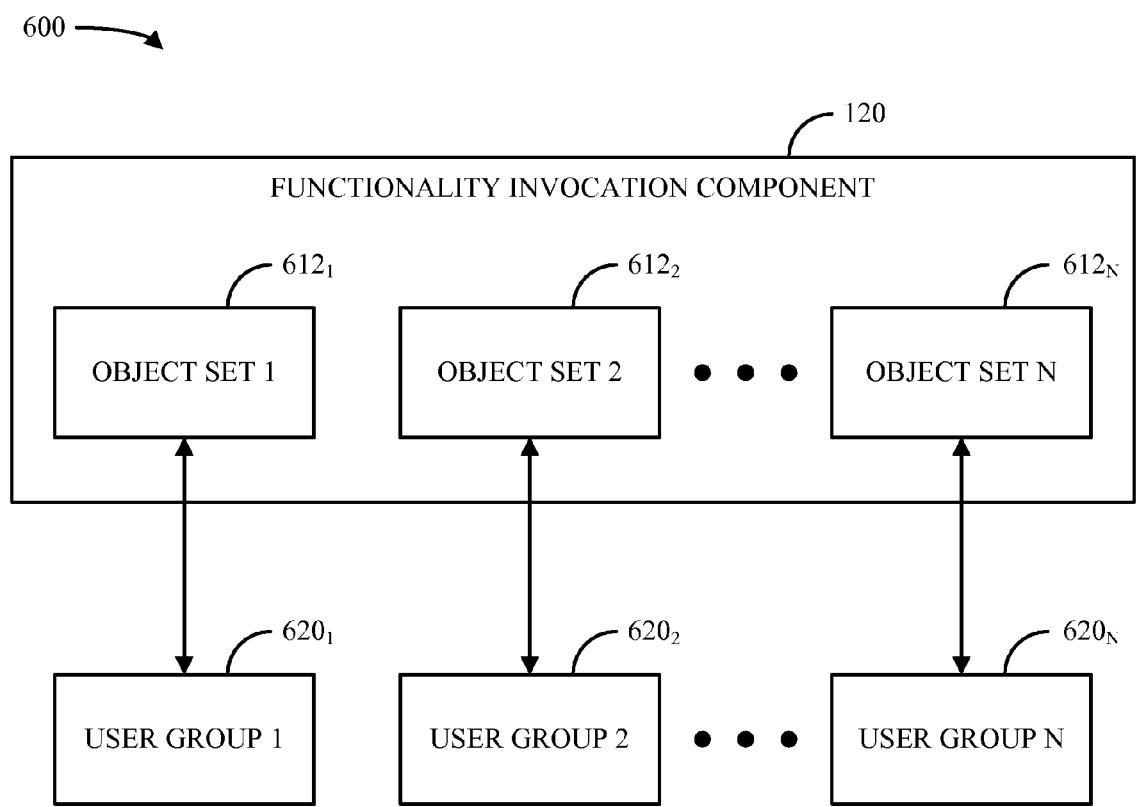
FIG. 6 is a block diagram of a system for providing an interactive service for multiple users in accordance with various aspects.

FIG. 6 is a block diagram of a system 600 for providing an interactive service for multiple users 620 in accordance with various aspects. As FIG. 6 illustrates, system 600 can include a functionality invocation component 120, which can operate in accordance with various aspects described herein. In one example, the functionality invocation component 120 can enable activation of one or more functions within an interactive computing service utilized by a plurality of users via interaction with a plurality of multimedia objects. For example, as system 600 illustrates, users having access to an interactive service associated with functionality invocation component 120 can be divided into a plurality of overlapping or non-overlapping groups 620 by the functionality invocation component 120 and/or another suitable entity associated with system 600. Division of users into user groups 620 can be performed in any suitable manner and can be based on any appropriate random or non-random, arbitrary or non-arbitrary factor. By way of specific, non-limiting example, users can be divided into user groups 620 at random and/or based on user characteristics such as IP address, location, Internet Service Provider (ISP), browsing habits, or the like.

Subsequent to division of users into user groups 620, the functionality invocation component can associate overlapping or non-overlapping sets 612 of objects with respective user groups 620 such that an object delivered to a user in a given user group 620 is selected from a set 612 corresponding to the user group 620. In one example, object sets 612 can utilize overlapping or non-overlapping multimedia content and/or interaction patterns, thereby substantially increasing the difficulty for an automated program of obtaining complete information relating to the objects implemented by the functionality invocation component 120. It can be appreciated that user groups 620 can be constructed using any appropriate size, including a size of one user, and that disparate user groups 620 can have uniform or non-uniform sizes.

In accordance with one aspect, a shell service provider can employ human users to study the advertising images of an underlying service to attempt to extract enough information to update shell service clients to interpret and respond correctly to the images provided by the underlying service. However, as described above, a functionality invocation component 120 can utilize a plurality of object sets 612 to vary its images along multiple dimensions in order to make analysis difficult.

In one example, the functionality invocation component 120 can construct object sets 612 utilizing a substantially large amount of multimedia content that respectively is utilized for limited time periods such that different images and/or other multimedia elements are constantly rotated in and out of circulation. As stated above, these multimedia elements can further be targeted to various user groups 620 based on random and/or arbitrary non-random (e.g., last digit of IP address) criteria, thereby forcing a shell service operator to obtain and analyze multimedia objects from numerous clients in order to cover all possibilities relating thereto.

Figure 7:
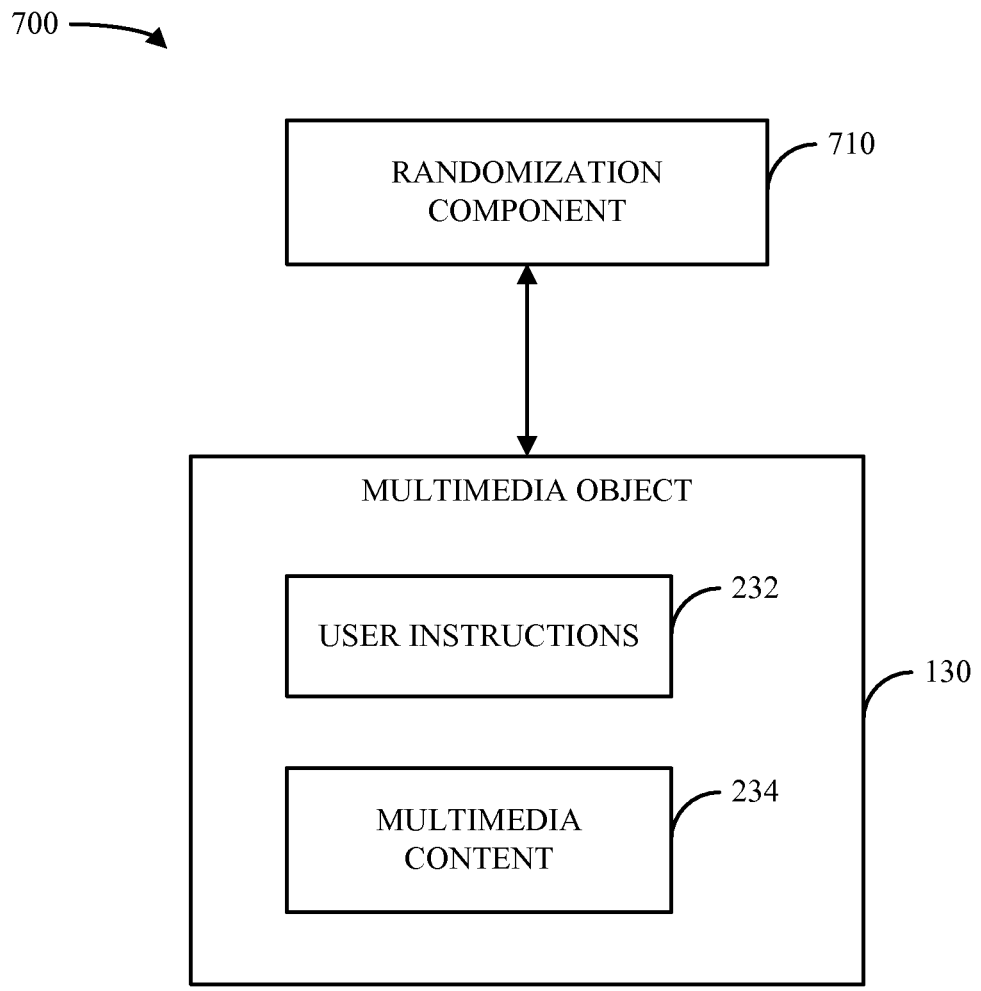
FIG. 7 is a block diagram of a system for randomizing multimedia objects used for function invocation in an interactive service in accordance with various aspects.

Referring to FIG. 7, a block diagram of a system 700 for randomizing multimedia objects 130 used for function invocation in an interactive service in accordance with various aspects is illustrated. As system 700 illustrates, a multimedia object 130 can include user instructions 232 and/or multimedia content 234 and can be delivered to a user in order to enable invocation of one or more functions of an interactive service via interaction therewith. Additionally, system 700 can include a randomization component 710, which can randomize at least one of multimedia content 234 utilized in connection with a multimedia object 130 or a predetermined set of interactions therewith.

In accordance with one aspect, one or more aspects of a multimedia object 130 can be randomized by the randomization component 710 for disparate users and/or disparate accesses of a protected function by a single user. By randomizing objects 130 in this manner, an interactive service can be protected from automation via a program that analyzes the objects 130 for repetition. As an additional safeguard against repetition, the randomization component 710 can also check a multimedia object 130 for repetition and reject the object if it is determined to be impermissibly similar to a previously-used object.

In accordance with another aspect, the randomization component 710 can provide countermeasures against automation by a shell service in a variety of manners. For example, the randomization component 710 can facilitate the use of an arbitrarily high number of variations of image elements or other multimedia elements. Variations of multimedia elements utilized by the randomization component 710 can potentially be created using a high degree of stylization; however, in one example a limit on stylization can be imposed to ensure recognizable elements. By employing variations in this manner, a shell service can be presented with a daunting image recognition task in recognizing all potential image elements automatically.

In another example, the randomization component 710 can provide the required actions for image and/or other multimedia elements as well as their descriptions with sufficient variety to make it difficult for a shell service to take them all into account. Additionally and/or alternatively, the randomization component can vary the locations of multimedia content 234 within a multimedia object 130 to facilitate a corresponding variation in the required interactions on the multimedia content 234 based on its location(s). In a further example, a given set of image and/or other multimedia elements can be provided to a client until its functionality is used. As a result, it can be ensured that a shell service will be unable to hold off on the functionality it wants to invoke, marking time by invoking alternate or null functionality until it gets a set of image elements it recognizes.

In general, it can be appreciated that system 600 and/or 700, as well as the other aspects described herein, can be utilized to protect an interactive service such as a Web service against automation by shell services or similar mechanisms. In one example, assuming that shell service updates take at least several hours to construct, release and distribute, the various countermeasures described above can be utilized to ensure that most shell service clients spend a significant percentage of the time unable to invoke some crucial functionality of their underlying service, despite any investment by the shell service client's distributor in analyzing advertisements and/or other challenge objects and updating its clients. Accordingly, use of shell services and other such unauthorized use of a protected interactive service can be reduced as both the user convenience and margin advantage that shell services would offer under current circumstances would be substantially reduced.

Figure 8:
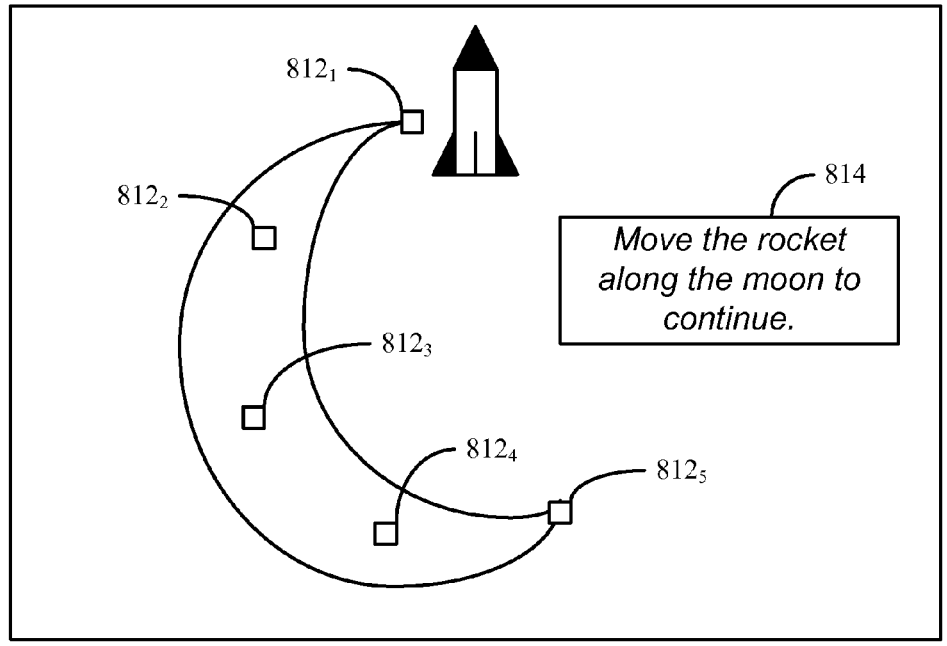
FIGS. 8-9 are respective illustrations of example invocation objects that can be utilized in accordance with various aspects.
Figure 8:
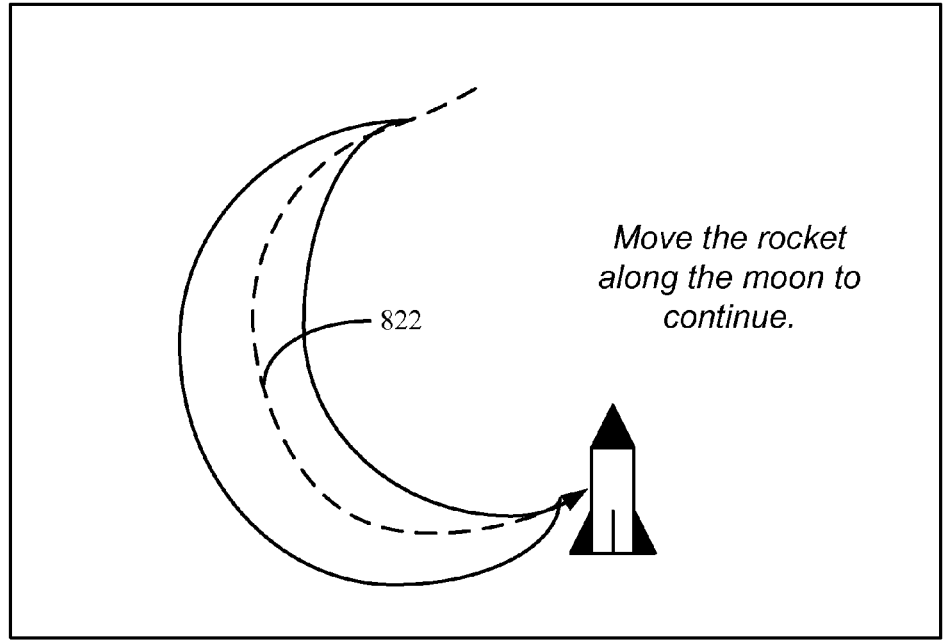

FIG. 8 is an illustration of an example activation object that can be utilized in accordance with various aspects to, for example, invoke one or more functions within an interactive service. More particularly, FIG. 8 illustrates an example of an access control object wherein an image of a rocket is to be traced along an image of a moon. It should be appreciated, however, that any suitable multimedia objects and/or interactions could be utilized in accordance with the aspects described herein. For example, an activation object as illustrated by FIG. 8 can incorporate one or more multimedia advertising elements, such as product images, logos, slogans, audio and/or video advertisements, or the like.

In one example, an activation object can be defined as illustrated in diagram 810. As diagram 810 illustrates, the images of the moon and rocket can be placed at initial locations within the activation object. It can be appreciated that these initial locations can be predetermined, randomly selected, and/or provided in any suitable manner. A set of control points 812 can then be placed through the activation object to define a desired class of interactions. In one example, control points 812 can respectively be associated with locations within the activation object (represented as squares in diagram 810) and/or actions to be performed within the activation object (e.g., hovering/dragging a cursor, carrying an object, etc.). User instructions 814 regarding the desired interaction can additionally be provided within the activation object.

Upon defining the activation object, a user can interact with said object as illustrated in diagram 820. In particular, diagram 820 illustrates an interaction wherein a user has moved the rocket from the top of the moon along path 822 to the bottom of the moon. It should be appreciated that path 822 can, but need not, be displayed to a user in connection with interaction with an activation object. In one example, data relating to path 822 and the actions performed thereon can be relayed to a server machine or another appropriate access controller, wherein a comparison can be made between the performed user interaction and the desired class of interactions. If, for example, it is determined that the rocket has been moved within a predetermined distance of all of the control points 812 in a specified order (e.g., from the top of the moon to the bottom), a match can be declared and a function corresponding to the activation object can be invoked.

In accordance with one aspect, an activation object similar to that illustrated by FIG. 8 can be utilized to collect preference information and/or relating to a user. For example, an activation object can be provided to a user wherein the user is instructed to move his or her favorite of a plurality of different advertised products from its original location to an ending location. In such an example, after a user has moved a product to the ending location, information relating to the product moved can be collected and utilized in subsequent targeting and/or other actions.

Figure 9:
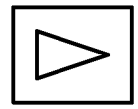

FIG. 9 illustrates another activation object 900 that can be utilized to facilitate invocation of one or more functions of an interactive service. As object 900 illustrates, a user can be prompted to play an audio or other multimedia clip, after which the user can be instructed to interact with one or more items corresponding to the clip. For example, as illustrated in object 900, the user is instructed to circle a type of product described in the audio clip. In one example, to prevent against automation, the product type choices and/or the play button for the audio clip can be provided in random locations within the object 900.

Figure 10:
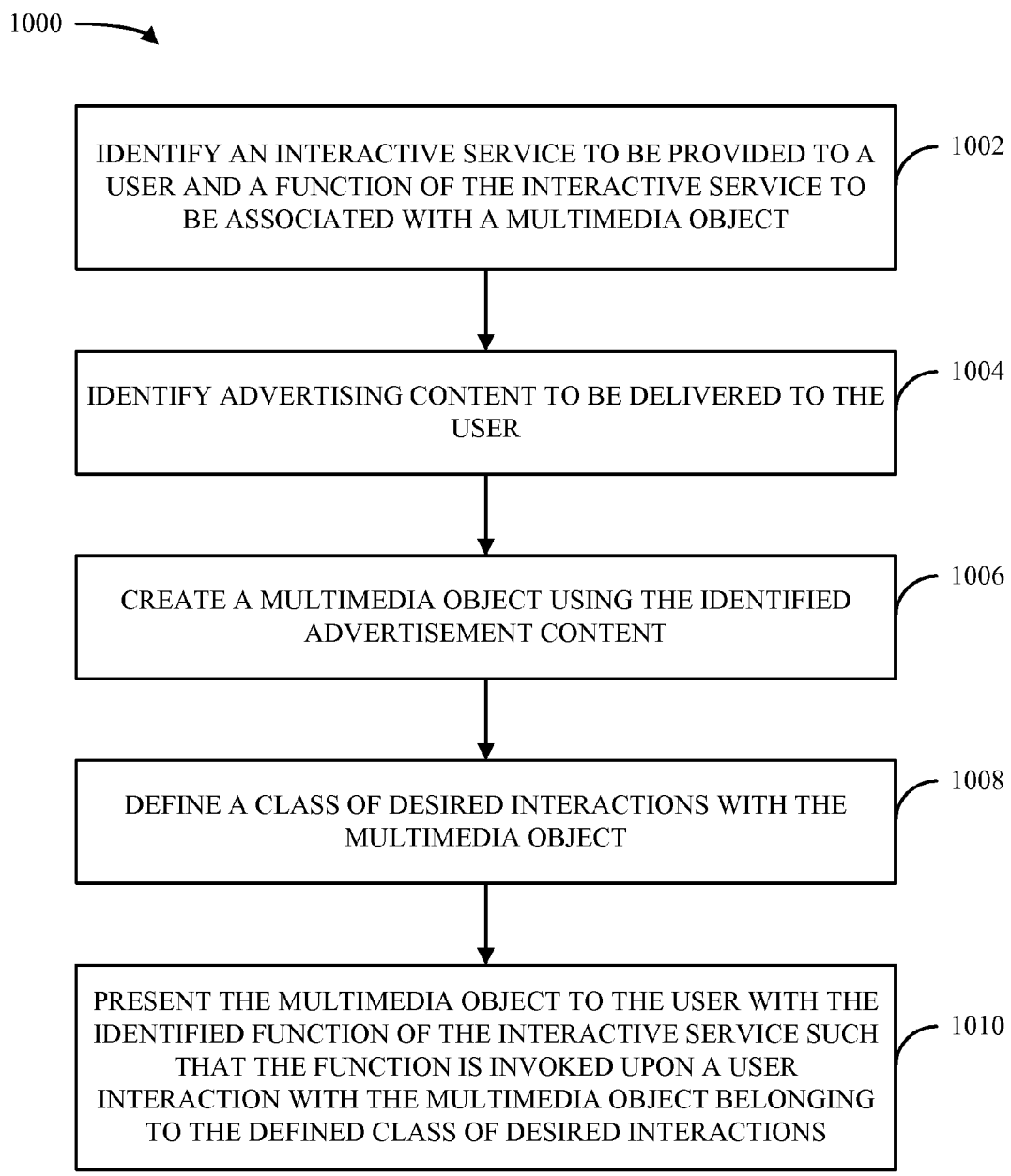
FIG. 10 is a flowchart of a method for providing an advertising-merged interactive service.
Figure 11:
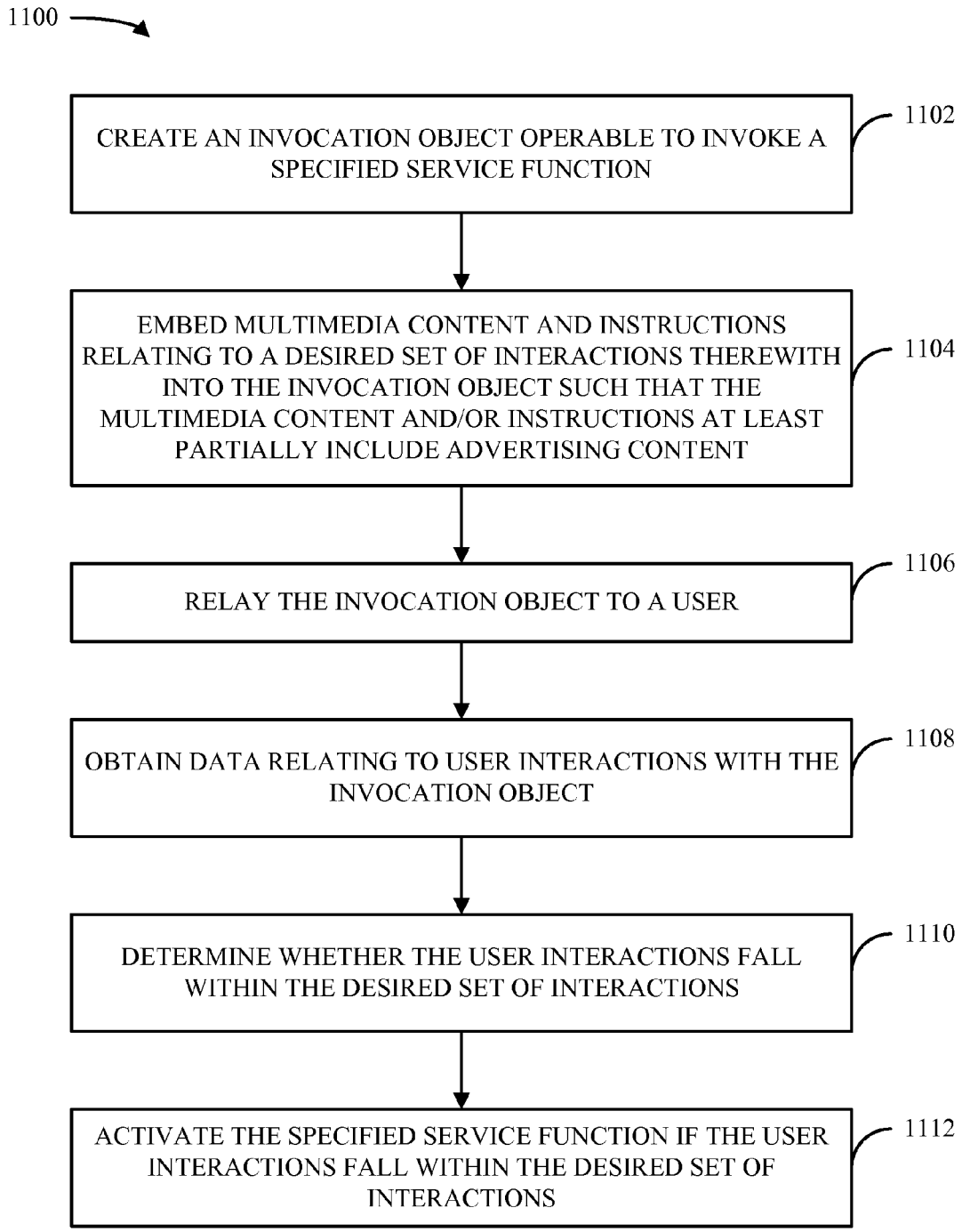
FIG. 11 is a flowchart of a method for preventing automation of an interactive service.

Turning to FIGS. 10-11, methodologies that may be implemented in accordance with various features presented herein are illustrated via respective series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Referring to FIG. 10, a method 1000 of providing an advertising-merged interactive service (e.g., an interactive service 110) is illustrated. At 1002, an interactive service to be provided to a user (e.g., a user 140) and a function of the interactive service (e.g., a service function 112) for which automation is to be prevented are identified. At 1004, advertising content to be delivered to the user (e.g., advertising content provided by an advertising component 410) is identified. At 1006, a multimedia object (e.g., a multimedia object 130) is created using the advertising content identified at 1004. At 1008, a class of desired interactions with the multimedia object created at 1006 is defined. At 1010, the multimedia object created at 1006 is presented to the user with the function of the interactive service identified at 1002 such that the function is invoked upon a user interaction with the multimedia object belonging to the class of desired interactions therewith defined at 1008 (e.g., as determined by a matching component 122).

Referring now to FIG. 11, a flowchart of a method 1100 for preventing automation of an interactive service is provided. At 1102, an invocation object operable to invoke a specified service function is created. At 1104, multimedia content (e.g., multimedia content 234) and instructions relating to a desired set of interactions with the multimedia content (e.g., user instructions 232) are embedded into the invocation object such that the multimedia content and/or instructions at least partially include advertising content. At 1106, the invocation object is relayed to a user. At 1108, data relating to user interactions with the invocation object are obtained. At 1110, it is determined (e.g., by an interaction interpretation component 322) whether the user interactions fall within the desired set of interactions corresponding to the instructions embedded into the invocation object at 1104. At 1112, the specified service function is activated if it is determined at 1110 that the user interactions fall within the desired set of interactions.

Figure 12:
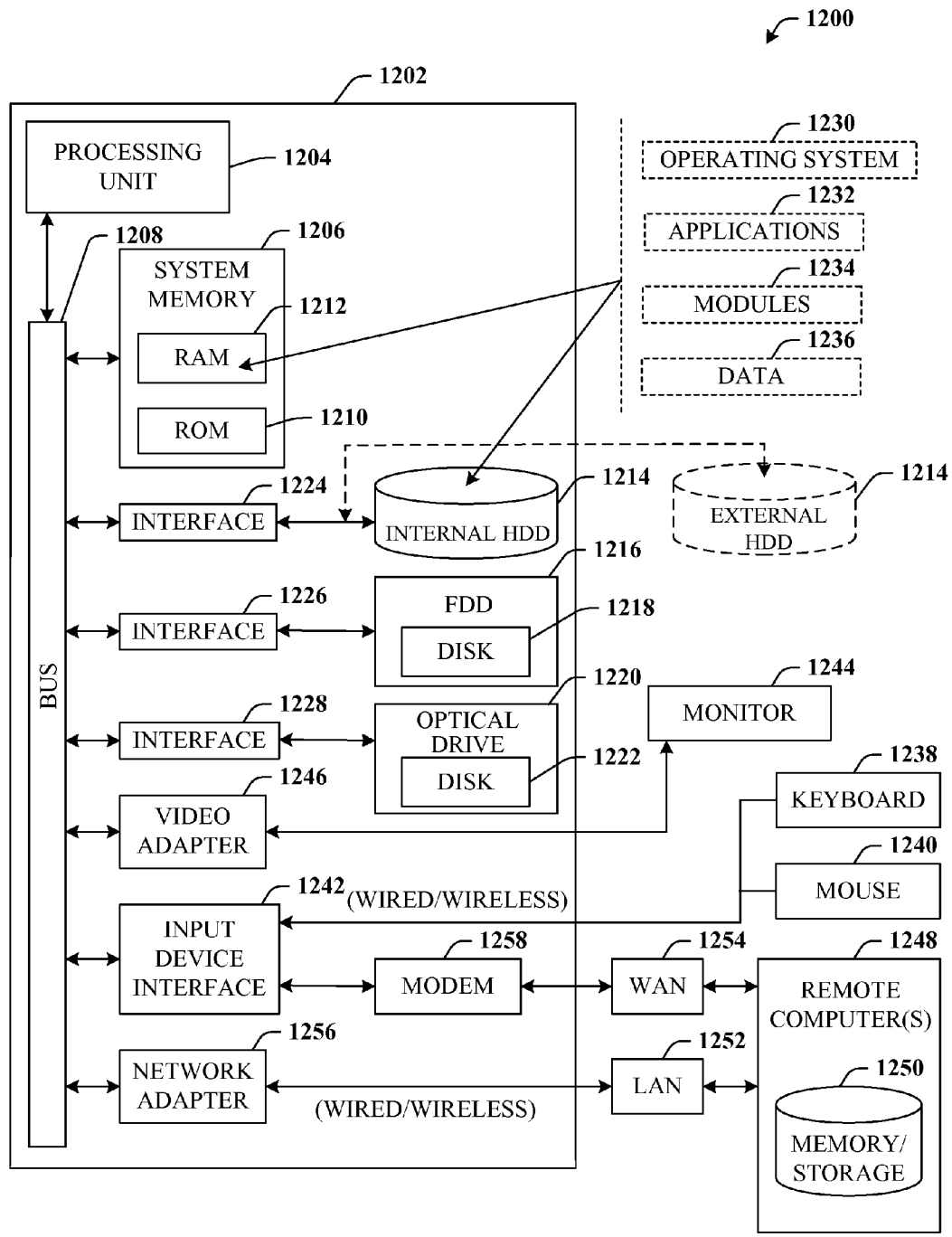
FIG. 12 is a block diagram of a computing system in which various aspects described herein can function.

In order to provide additional context for various aspects described herein, FIG. 12 and the following discussion are intended to provide a brief, general description of a suitable computing environment 1200 in which various aspects of the claimed subject matter can be implemented. Additionally, while the above features have been described above in the general context of computer-executable instructions that may run on one or more computers, those skilled in the art will recognize that said features can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, an exemplary environment 1200 for implementing various aspects described herein includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a nonvolatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the claimed subject matter can be implemented with various commercially available operating systems or combinations of operating systems.

A user can enter commands and information into the computer 1202 through one or more wired/wireless input devices, e.g. a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, a serial port, an IEEE-1394 port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10BaseT wired Ethernet network.

Figure 13:
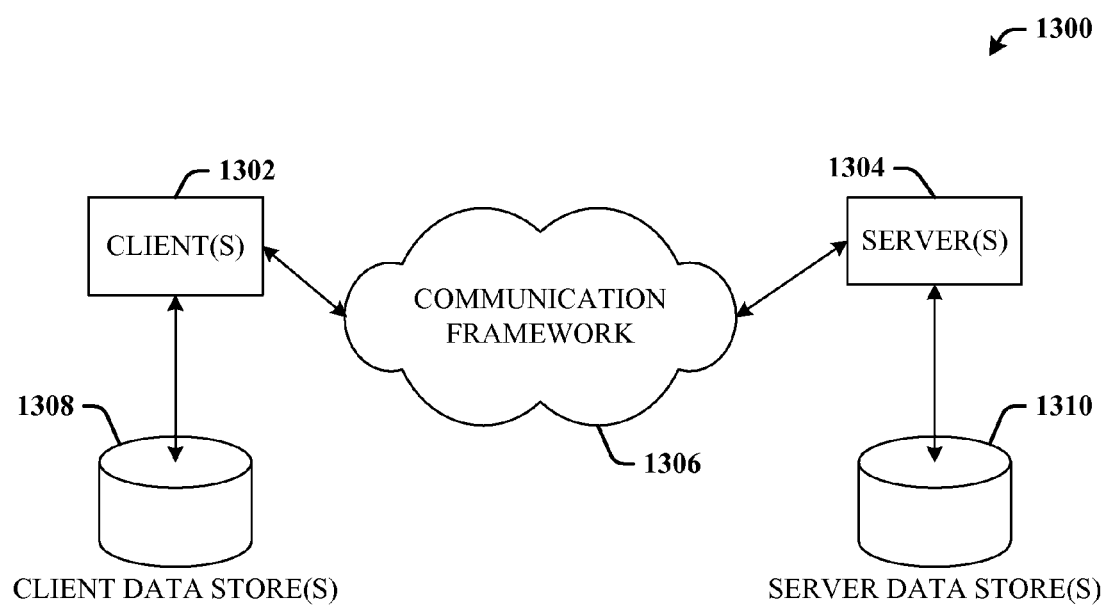
FIG. 13 illustrates a schematic block diagram of an example networked computing environment.

Referring now to FIG. 13, there is illustrated a schematic block diagram of an exemplary computer compilation system operable to execute the disclosed architecture. The system 1300 includes one or more client(s) 1302. The client(s) 1302 can be hardware and/or software (e.g. threads, processes, computing devices). In one example, the client(s) 1302 can house cookie(s) and/or associated contextual information by employing one or more features described herein.

The system 1300 also includes one or more server(s) 1304. The server(s) 1304 can also be hardware and/or software (e.g., threads, processes, computing devices). In one example, the servers 1304 can house threads to perform transformations by employing one or more features described herein. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g. a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system comprising:
an interactive service having one or more functions associated therewith;
a set of multimedia objects;
a randomization component that is configured to randomly select a multimedia object from the set of multimedia objects and to provide countermeasures against automation by a shell service; and
a processor that is a component of a computer that is configured to implement a functionality invocation component, the functionality invocation component being configured to deliver the randomly selected multimedia object within the interactive service, and including a matching component configured to analyze interaction with the randomly selected multimedia object and determine whether the analyzed interaction satisfies one or more predetermined criteria for accessing the one or more functions, the randomly selected multimedia object including a set of instructions and multimedia content, the set of instructions being presented as one or more images embedded in the multimedia content and being stylized utilizing a captcha-like technique, and the set of instructions identifying manipulations of visual elements of the multimedia content that are required to satisfy the one or more predetermined criteria; and
an advertising component configured to provide one or more advertising elements, the functionality invocation component being configured to utilize the one or more advertising elements as part of the multimedia content in the randomly selected multimedia object delivered within the interactive service, and the countermeasures including rejecting one of the multimedia objects based on a similarity to a previously used multimedia object.

2. The system of claim 1, the set of instructions including textual instructions that describe the required manipulations of the visual elements and that identify the one or more functions of the interactive service, and the countermeasures including employing a number of stylization variations.

3. The system of claim 1, the advertising component comprising a targeting component configured to select the one or more advertising elements based on multiple demographic characteristics of a target.

4. The system of claim 1, the randomization component being configured to randomize locations of the multimedia content included in the multimedia object.

5. The system of claim 1, the manipulations of the visual elements including at least one of operation of an animated version or an audio version of an advertised product, and selection of the advertised product from a line of related objects or identification of a product slogan from a list of phrases.

6. The system of claim 1, the one or more predetermined criteria including a predefined set of interactions with the randomly selected multimedia object that a user must perform to activate the one or more functions of the interactive service, and the predefined set of interactions comprising at least one interaction that includes moving the randomly selected multimedia object along a predetermined path.

7. The system of claim 1, further comprising an interaction interpretation component configured to analyze data relating to the interaction with the multimedia object to determine whether the interaction falls within a predetermined class of interactions, and the class of interactions including at least one action relative to a cursor.

8. The system of claim 7, the functionality invocation component being located at a server device that is disparate from a device from which the data is received, and the at least one action including hovering the cursor.

9. The system of claim 7, the predetermined class of interactions including another action that is defined by at least one control point configured to specify a position within the multimedia object and an action, the action including moving the multimedia object in a set direction relative to the control point.

10. The system of claim 1, the functionality invocation component being configured to divide identifiers corresponding to users of the interactive service into a plurality of groups, identify respective sets of multimedia objects corresponding to the groups, and deliver a multimedia object corresponding to an identifier of a user selected from the set of multimedia objects corresponding to the group to which the selected identifier belongs, the groups being selected utilizing an arbitrary but not random selection process.

11. The system of claim 10, the interactive service including an electronic mail service, and the selection process being based at least in part on an IP address or a location.

12. A method comprising:
identifying a function of an interactive service for which automated use is to be prevented;
identifying advertising features to be delivered within the interactive service;
creating a set of multimedia objects utilizing multimedia content that includes the identified advertising features;
defining a set of interactions with the set of multimedia objects;
collecting demographic information for a plurality of users;
dividing the plurality of users into a number of different groups;
utilizing a processor that is a component of a computer to select one of the multimedia objects from the set based at least in part on the demographic information and the number of different groups;
checking the selected multimedia object to determine whether or not it is similar to a previously used multimedia object, and rejecting the multimedia object based on a determination that it is similar to the previously used multimedia object;
varying at least one of the selected multimedia object, one or more of the advertising features incorporated into the multimedia object, or the defined set of interactions with the multimedia object;
presenting the selected multimedia object; and
controlling access to the identified function of the interactive service based on matching an interaction with the selected multimedia object with the defined set of interactions.

13. The method of claim 12, further comprising incorporating instructions that describe the defined set of interactions into the selected multimedia object, and replacing the set of multimedia objects with a new set of multimedia objects after a predetermined time period, and the demographic information including age, occupation, income, education, interests, products owned, products used, and location information.

14. The method of claim 12, further comprising targeting at least one of the selected multimedia object, the defined set of interactions, or one or more of the advertising features incorporated into the multimedia object to a target based on one or more characteristics of the target, and the plurality of users being divided into groups on a random basis.

15. The method of claim 12, the plurality of users being divided into groups on a non-random basis, and the controlling the access comprising:
   recording the interaction with the selected multimedia object; and
   comparing the recorded interaction to the defined set of interactions with the multimedia object to determine whether the interaction falls within the defined set of desired interactions.

16. The method of claim 12, further comprising delivering the selected multimedia object multiple times until its functionality is used.

* * * * *